Dec. 26, 1961  C. J. COBERLY  3,014,367
APPARATUS FOR MEASURING BOTTOM HOLE PRESSURE
Filed April 21, 1958  2 Sheets-Sheet 2
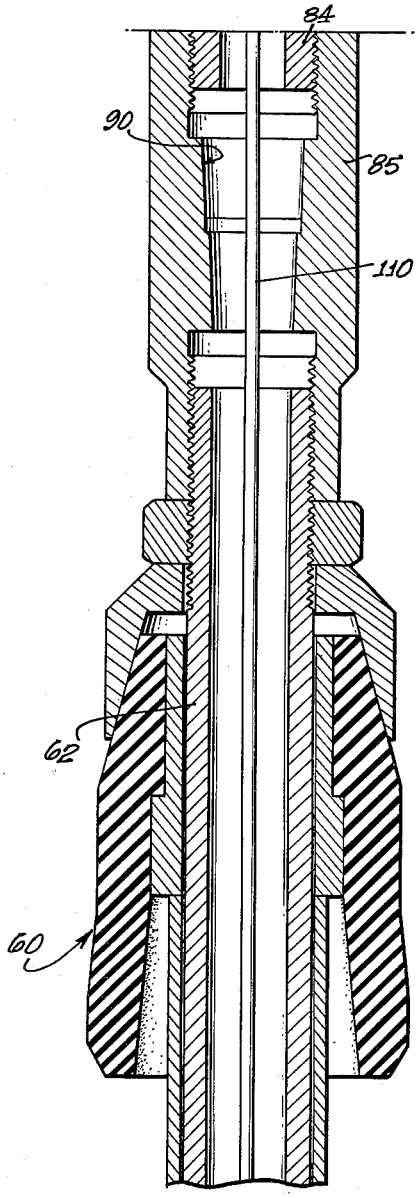
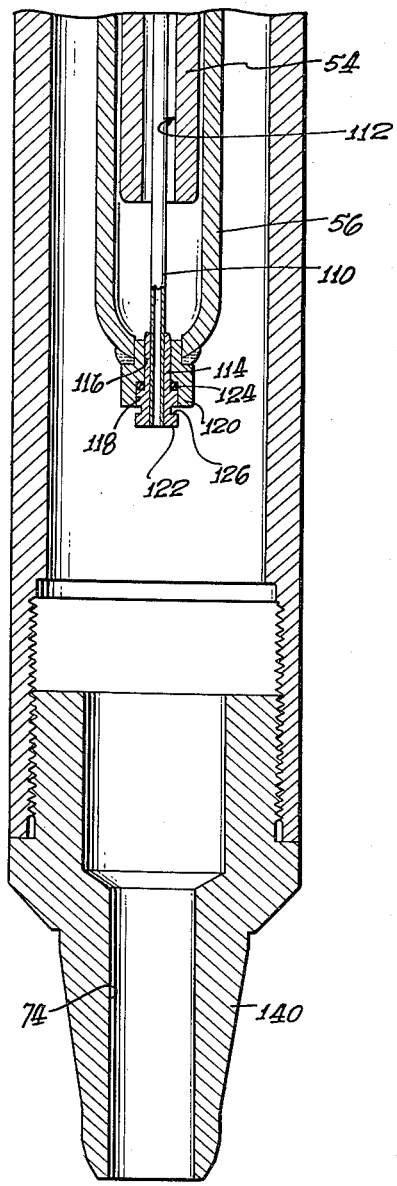
INVENTOR.
CLARENCE J. COBERLY,
By His Attorneys.
HARRIS, KIECH, FOSTER & HARRIS

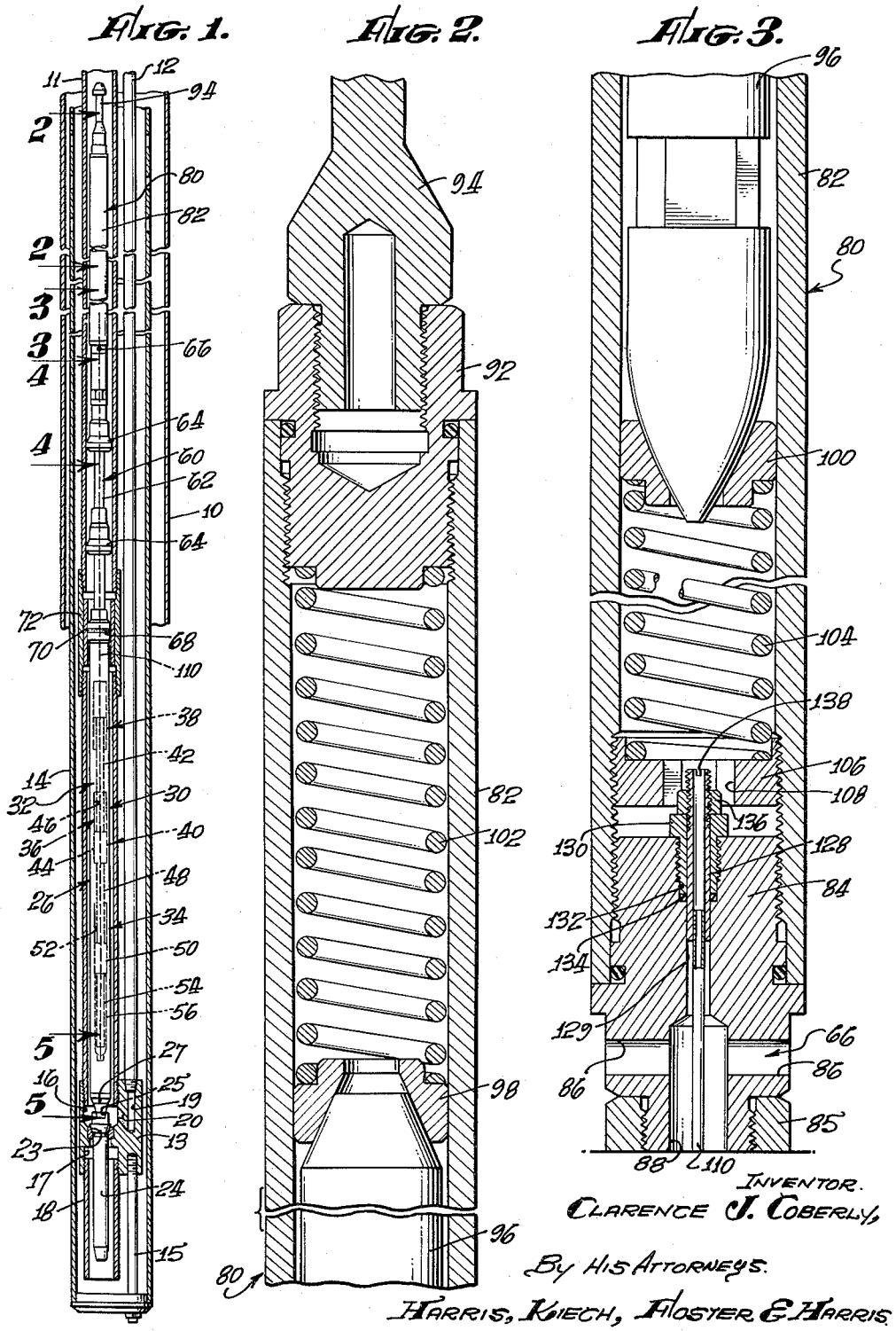

3,014,367
APPARATUS FOR MEASURING BOTTOM HOLE PRESSURE
Clarence J. Coberly, San Marino, Calif., assignor to Kobe, Inc., Huntington Park, Calif., a corporation of California
Filed Apr. 21, 1958, Ser. No. 729,747
9 Claims. (Cl. 73—155)

The present invention relates in general to pressure measuring apparatus and, more particularly, to an apparatus for measuring the bottom hole pressure in a well, such as an oil well, while the well is being pumped.

In pumping an oil well, it is occasionally desirable to determine the bottom hole or formation pressure obtaining in the well while the well is shut in and while it is being pumped at various rates, this being done to check on the performance of the well, the performance of the pump, and the like. In order to obtain pressure data having any significance, it is important that the formation pressures for various pumping rates be measured without substantially altering conditions normally prevailing in the well and in the pump. Any formation pressure testing procedure which involves long delays in getting the pressure measuring equipment into position, or which requires pulling and rerunning tubing strings, or the like, is unsatisfactory since conditions in the well may change to such an extent before the pressure measurements are obtained that they are of no value.

Formation pressure tests may be made without any substantial change in conditions prevailing at the time the necessity for the tests is indicated by utilizing a pressure measuring device in combination with a fluid operated, free pump in the manner taught by my Patent No. 2,674,126, granted April 6, 1954. As more fully discussed in the patent mentioned, such a pump-tester combination minimizes the time required to get the pressure measuring device into position in the well so that the conditions prevailing at the time the pressure test appears desirable are substantially unchanged by the time the test is actually made. Also, such a pump-tester combination eliminates any possibility of backwashing the productive formation and thus avoids the resulting changes in the well conditions. Further, the total cost of making the test is minimized.

While the pump-tester assembly of my Patent No. 2,674,126 achieves the foregoing results entirely satisfactorily, it is subject to one disadvantage in that the pressure measuring device is located below the pump, which results in rendering the normal sealing means between the pump and the tubing or housing in which the pump is disposed inoperative so that a special sealing means between the pump and the tubing must be provided when the measuring device is used in conjunction with the pump.

A primary object of the present invention is to provide a pump-tester combination, including a fluid operated, free pump and a pressure measuring device, which achieves all of the desirable results attainable with the structure of the patent mentioned, but which utilizes the normal sealing means between the pump and the tubing when the pump is in its operating position, and which thus requires no special sealing means when the measuring device is utilized in conjunction with the pump.

More particularly, an important object of the invention is to provide a pump-tester assembly wherein the pressure measuring device is located above the pump, instead of therebelow, so that the pump, when utilized in the pump-tester combination, occupies exactly the same position in the well as it does when used alone. Thus, the normal sealing means between the pump and the tubing is utilized with the present invention, whether the pump is operated by itself, or is used in conjunction with the pressure measuring device. This is of particular importance in closed system free pumps, such as shown in my Patent No. 2,589,671, which require a double seal in a special sealing collar.

Considering the invention more specifically, an object thereof is to provide a combined pumping and pressure measuring apparatus which includes a pressure measuring device connected to the upper end of the fluid operated, free pump and which includes passage means extending axially completely through the pump from the inlet of the pump to the pressure measuring device so as to apply the well fluid pressure in the pump inlet to the pressure measuring device.

A further object of the invention is to utilize a pump of the type disclosed in my Patent No. 2,081,223, issued May 25, 1937, and to run the passage means connecting the pump inlet to the pressure measuring device through the tubular, reciprocatory engine and pump piston assembly of the pump, whereby this assembly reciprocates back and forth relative to the passage means in question when the pressure measuring device is utilized to measure the bottom hole pressure with the pump in operation.

More particularly, an object of the invention is to utilize as the passage means between the pump inlet and the pressure measuring device a small-diameter tube the lower end of which extends through the lower end of the balance tube of the pump of my Patent No. 2,081,223 into communication with the pump inlet, and the upper end of which communicates with a tubular housing connected to the upper end of the pump and containing the pressure measuring device, the tube in question extending axially through the lower rod, the pump piston, the intermediate rod, the engine piston and the upper or valve rod of the pump.

Another object of the invention is to locate the usual free-pump packer assembly, by means of which the free pump is displaced to the surface hydraulically through the tubing in which it is disposed, between the upper end of the pump and the lower end of the tubular housing containing the pressure measuring device, this packer assembly serving as a connecting means between the tubular housing for the pressure measuring device and the pump. The tube which connects the pump inlet to the tubular housing containing the pressure measuring device extends axially through the packer assembly.

The foregoing objects, advantages, features and results of the present invention, together with various other objects, advantages, features and results thereof which will be apparent to those skilled in the art to which the present invention pertains in the light of this disclosure, may be attained with the exemplary embodiment of the invention described in detail hereinafter and illustrated in the accompanying drawings, in which:

FIG. 1 is a vertical sectional view illustratng the pump-tester assembly of the invention in its operating position in a well; and FIGS. 2, 3, 4 and 5 are enlarged, fragmentary vertical sectional views of the pump-tester combination respectively taken along the arrowed lines 2—2, 3—3, 4—4 and 5—5 of FIG. 1.

Referring particularly to FIG. 1 of the drawings, the numeral 10 designates a casing which is set in an oil well with its lower end open to a surrounding productive formation, as by being provided with perforations, not shown, so that well fluid from such formation may flow into the casing. Set in the casing are a power or supply tubing 11 for operating fluid under pressure and a production tubing 12 for pumped well fluid and spent operating fluid, these tubings being connected at their lower ends by a bottom shoe 13. In the particular construction shown, the lower ends of the supply and production tubings 11 and 12 and the bottom shoe 13 are enclosed by a gas anchor 14 secured to the bottom shoe by a bolt 15. The bottom shoe 13 is provided with a bore therethrough having at its upper end a counterbore 16 into which the lower end of the supply tubing 11 is threaded and having at its lower end a counterbore 17 into which an inlet tube 18 for well fluid is threaded. The bottom shoe 13 is also provided with a bore 19 into which the lower end of the production tubing 12 is threaded, this bore communicating with the counterbore 16 through a lateral passage 20 in the bottom shoe. With this construction, spent operating fluid and pumped well fluid may flow into the production tubing 12 and upwardly therein to the surface.

The bottom shoe 13 carries a seat 23 for a standing valve assembly 24 which extends downwardly into the inlet tube 18. As is well known in the art, the standing valve assembly 24 permits upward flow of well fluid therethrough so that such fluid may be pumped to the surface through the production tubing 12, but prevents downward flow therethrough into the well.

The standing valve assembly 24 provides at its upper end a seat 25 for a pump-tester assembly or combination 26 of the invention, this assembly being hydraulically movable through the supply tubing 11 between the surface and an operating position wherein it is seated on the seat 25, as is well known in the art. Briefly, the assembly 26 may be moved downwardly through the supply tubing 11 into its operating position by the combined action of gravity and fluid pressure applied to the upper end thereof, fluid below the assembly being displaced upwardly through the production tubing 12 to the surface since the standing valve assembly 24 prevents backflow into the well. By reversing the flow through the system, i.e., by supplying operating fluid under pressure to the production tubing 12, instead of to the supply tubing 11, the pump-tester combination 26 may be circulated to the surface. The assembly 26 is first unseated by the application of fluid pressure from the production tubing 12 to an annular area 27 at the lower end thereof, and is then moved upwardly to the surface hydraulically by the application of pressure to the entire cross-sectional area thereof.

The pump-tester assembly 26 includes a fluid operated pump 30 which is preferably of the type disclosed in my Patent No. 2,081,223. The pump 30 includes an engine section 32 and a pump section 34 below the engine section, the engine section including a fluid operated engine 36 controlled by a fluid operated engine valve 38. The engine and pump sections 32 and 34 will be regarded hereinafter as including a reciprocatory engine and pump piston assembly 40 for convenience, this assembly including a tubular upper or valve rod 42 which cooperates with the engine valve 38, a tubular engine piston 44 reciprocable in an engine cylinder 46 and connected to the lower end of the valve rod 42, a tubular intermediate rod 48 connected to the lower end of the engine piston 44, a tubular pump piston 50 reciprocable in a pump cylinder 52 and connected to the lower end of the intermediate rod 48, and a tubular lower or balance rod 54 connected to the lower end of the pump piston 50 and movable back and forth axially of a balance tube 56 adjacent the lower end of the pump 30.

Connected to the upper end of the pump 30 is a packer assembly 60 which includes a tubular packer mandrel 62 carrying downwardly-facing packer cups 64 which are adapted to sealably engage the wall of the supply tubing 11 to prevent upward flow of fluid around the assembly 26 when operating fluid under pressure is introduced beneath the assembly through the production tubing 12 in moving the assembly 26 to the surface hydraulically. The packer assembly 60 provides an operating fluid intake 66 for the pump 30, operating fluid under pressure introduced into the supply tubing 11 entering the operating fluid intake 66 and flowing downwardly through the tubular packer mandrel 62 into the engine section 32 of the pump to operate the pump in a well known manner.

The pump 30 is provided below the upper end thereof with an operating fluid exhaust, not shown, for spent operating fluid, the operating fluid under pressure and the spent operating fluid being separated when the pump-tester assembly 26 is in its operating position by a packing or sealing means comprising an O-ring 68 carried by the pump and engaging a liner 70 pressed into a sealing collar 72 which serves as a coupling between two sections of the supply tubing 11.

The pump 30 is provided at its lower end with an inlet 74, FIG. 5, which communicates with the well through the standing valve assembly 24 to admit well fluid to be pumped into the pump 30. The pump is also provided with a production fluid outlet, not shown, located between the standing valve assembly 24 and the sealing collar 72, whereby the production fluid discharged by the pump and the spent operating fluid discharged thereby are mixed and pumped upwardly to the surface through the production tubing 12 in the particular construction illustrated.

It is thought that the operation of the pump 30 will be clear from the foregoing and from my Patent No. 2,081,223, the operation of the pump being basically as set forth in such patent. Consequently, a further description herein is not necessary.

The pump tester-assembly 26 includes a pressure measuring means, designated generally by the numeral 80, FIGS. 2 and 3, which is located above the pump 30 and which is exposed to the fluid pressure in the inlet 74 in a manner to be described. Since the pressure measuring means 80 is located above the pump 30, instead of below the pump as in my Patent No. 2,674,126, the O-ring 68 engages the liner 70 in the sealing collar 72 irrespective of whether the pump 30 is used alone, or in combination with the pressure measuring means 80. Thus, when the pressure measuring means 80 is combined with the pump 30 to form the pump-tester assembly 26, the normal sealing means between the pump and the supply tubing 11 is utilized, no special sealing means being required, which is an important feature of the invention.

Considering the pressure measuring means 80 in more detail with reference to FIGS. 2 and 3, it includes a tubular housing 82 which is threaded at its lower end onto a fitting 84, the latter being threaded into a fitting 85, FIGS. 3 and 4, which, in turn, is threaded onto the upper end of the packer mandrel 62. The fitting 84 is provided with ports 86 forming the operating fluid intake 66, the ports 86 communicating with a passage 88 which, in turn, communicates with the interior of the packer mandrel 62 through a passage 90 in the fitting 85. The housing 82 is threaded at its upper end onto a coupling 92 which, in turn, has threaded thereinto a nose member 94 engageable by a pump catcher, not shown, at the surface when the assembly 26 is hydraulically displaced to the surface. The nose member 94 is also threadable into the fitting 85 at the upper end of the packer mandrel 62 so that, when the pressure measuring means 80 is not in use, a nose member similar to the nose member 94 occupies the position occupied by the fitting 84 in the drawings, as will be discussed hereinafter.

Resiliently mounted in the tubular housing 82 is a pressure measuring device 96 conventionally known as a pressure bomb and comprising, for example, a clock-driven chart and a pressure gauge having means for recording bottom hole pressure on the chart, the clock having, for example, a 24, 48, or 72 hour time base. One well known pressure bomb of this nature is the Amerada Bomb. Also, as disclosed in my Patent No. 2,674,126, the pressure bomb 96 may be provided with means for preventing exposure of the pressure measuring and recording equipment within the bomb to excessive pressures. For more details of the pressure bomb 96 and such a pressure-exposure limiting means, attention is directed to my Patent No. 2,674,126.

Considering the manner in which the pressure bomb 96 is resiliently mounted, it is provided with tapered upper and lower ends engaged by complementary upper and lower spring seats 98 and 100 for upper and lower compression springs 102 and 104. The upper spring 102 is seated at its upper end against the coupling 92, while the lower spring 104 is seated at its lower end against a seat 106 threaded into the lower end of the housing 82 and provided with a central wrenching opening 108 therethrough. The foregoing resilient mounting for the pressure bomb 96 prevents shock forces, vibration, and the like, from damaging the equipment within the bomb.

Considering the manner in which communication is established between the inlet 74 of the pump 30 and the interior of the housing 82 so as to expose the pressure bomb 96 to the bottom hole pressure, a small-diameter tube 110 extends axially of the pump and the packer assembly 60 all the way from a point adjacent the inlet, as shown in FIG. 5, into the housing 82 to provide a passage means through the pump and the packer assembly interconnecting the inlet and the housing 82 in fluid communication. More particularly, the tube 110 extends from a point below the lower end of the balance tube 56 upwardly through an axial passage 112, FIG. 5, through the tubular balance rod 54, the tubular pump piston 50, the tubular intermediate rod 48, the tubular engine piston 44 and the tubular valve rod 42, the tube 110 continuing upwardly through the upper end of the pump 30, the packer mandrel 62, the fitting 85 and the fitting 84 into the tubular housing 82 for the pressure bomb 96. Thus, the engine and pump piston assembly 40 surrounds the intermediate portion of the tube 110 and is freely reciprocable relative thereto, the tube 110 in no way interfering with normal operation of the pump 30.

At its lower end, the tube 110 extends into and is silver soldered, or otherwise secured, to a plug 114, this plug being disposed in a bore 116 and a counterbore 118 in a fitting 120 welded, or otherwise secured, to the lower end of the balance tube 56. The plug 114 is provided with a head 122 which is disposed in the counterbore 118, an O-ring 124 being disposed between the head 122 and the bottom of the counterbore 118 for sealing purposes. A groove 126 in the head 122 of the plug 114 is adapted to receive a tool for pulling the plug, and the tube 110, from the fitting 120.

The upper end of the tube 110, as shown in FIG. 3 of the drawings, has silver soldered, or otherwise secured, thereto an externally threaded sleeve 128 disposed in a bore 129 in the fitting 84 and extending through a tubular fitting 130, the latter being threaded into a counterbore 132 in the fitting 84 and being sealed by an O-ring 134. A nut 136 is threaded onto the sleeve 128 and is seated on the fitting 130 to tension the tube 110 sufficiently to keep it straight and to keep it from contacting the walls of the axial passage 112 through the engine and pump piston assembly 40. The upper end of the sleeve 128 is provided with a screw driver slot 138 to hold the upper end of the tube 110 against rotation while tightening or loosening the nut 136.

When removing the pressure measuring means 80 from the pump-tester assembly 26 to permit the pump 30 to be utilized by itself, the tubular housing 82 is first disconnected from the fitting 84. Then the nut 136 is removed to release the upper end of the tube 110, whereupon the tube may be withdrawn from the pump 30 by pulling downwardly on the plug 114 after first removing a fitting 140 of the pump in which the inlet 74 is formed. Subsequently, the balance tube 56 with its special fitting 120 may be removed and a conventional balance tube, such as shown in my Patent No. 2,081,223, substituted therefor. Thereafter, the inlet fitting 140 is replaced and a nose member similar to the nose member 94, but provided with an operating fluid intake therein similar to the intake 66, is substituted for the fitting 84 at the upper end of the packer assembly 60. With these changes, the pump 30 becomes a conventional free, fluid operated pump capable of being utilized by itself without the pressure measuring means 80.

Considering the operation of the pump-tester assembly 26, it is circulated to the bottom of the well in the same manner as a conventional free, fluid operated pump, the inlet fitting 140 of the pump 30 seating on the standing valve assembly 24 in the conventional manner and the O-ring 68 engaging the liner 70 in the sealing collar 72 in the conventional manner to separate the operating fluid under pressure in the supply tubing 11 from the spent operating fluid and production fluid discharged by the pump 30. Thus, as hereinbefore indicated, no special sealing means is necessary.

Once the pump-testing assembly 26 has been circulated into its operating position in the foregoing manner, the pump 30 begins to operate as soon as the pressure in the operating fluid supply tubing 11 builds up to a sufficiently high value. When the pump 30 starts to operate, the standing valve in the standing valve assembly 24 unseats to apply the bottom hole pressure to the pressure bomb 96 through the tube 110. If the pump 30 is now stopped, the pressure bomb 96 will record the static or shut in bottom hole pressure. The pump 30 may then be re-started and operated at a rate which reduces the fluid level in the well until a balance is reached between the rates of entry and withdrawal, it sometimes being desirable to operate the pump at several different rates, allowing sufficient time at each to reach equilibrium conditions. The maximum pumping rate will be that at which a definite indication of pump off appears at the surface. During the foregoing, the pressure bomb continuously records the inlet pressure.

The pump 30 may then be stopped and the rate of fill up of the well determined by the record of bottom hole pressure provided by the pressure bomb 96.

The time required for the foregoing tests depends upon the well characteristics. Sometimes the well will pump down in a matter of hours, but, in other wells, it may take days.

When all of the desired tests have been made, the pump-tester assembly 26 is circulated to the surface in the same manner as the usual free, fluid operated pump. The tubular housing 82 is then opened and the pressure bomb 96 removed so that the chart may be removed therefrom for study. If the record is satisfactory, and if it is desired to utilize the pump 30 alone, the hereinbefore-discussed steps for converting the assembly 26 are followed, whereupon the pump 30 may be utilized alone.

Although an exemplary embodiment of the invention has been disclosed herein for purposes of illustration it will be understood that various changes, modifications and substitutions may be incorporated in such embodiment without departing from the spirit of the invention as defined by the claims which follow.

I claim:

1. A combined pumping and pressure measuring apparatus for a well including: a pump having upper and lower ends and having an inlet for well fluid to be pumped at its lower end; an annular sealing means carried by said pump above the lower end thereof; pressure measuring means connected to the upper end of said pump; and passage forming means extending axially through said pump and interconnecting said inlet and said pressure measuring means and placing said pressure measuring means in communication with said inlet.

2. A combined pumping and pressure measuring apparatus for a well, including: a fluid operated pump having upper and lower ends and having an inlet for well fluid to be pumped at its lower end, said pump including a reciprocatory engine and pump piston assembly having an axial passage therethrough; an annular sealing means carried by said pump above the lower end thereof; pressure measuring means connected to the upper end of said pump; and passage forming means extending through said axial passage and interconnecting said inlet and said pressure measuring means and placing said pressure measuring means in communication with said inlet.

3. A combined pumping and pressure measuring apparatus for a well, including: a fluid operated pump having upper and lower ends and having an inlet for well fluid to be pumped at its lower end, said pump including a reciprocatory engine and pump piston assembly having an axial passage therethrough; an annular sealing means carried by said pump above the lower end thereof; a tubular housing having upper and lower ends; means connecting the lower end of said tubular housing to the upper end of said pump; a pressure measuring device in said tubular housing; and passage forming means extending through said axial passage and said connecting means and interconnecting said inlet and said tubular housing in fluid communication.

4. A combined pumping and pressure measuring apparatus for a well, including: a fluid operated pump having upper and lower ends and having an inlet for well fluid to be pumped at its lower end, said pump including a reciprocatory engine and pump piston assembly having an axial passage therethrough; an annular sealing means carried by said pump above the lower end thereof; a tubular housing having upper and lower ends; means connecting the lower end of said tubular housing to the upper end of said pump, said connecting means including a packer assembly carrying at least one packer cup; a pressure measuring device in said tubular housing; and passage forming means extending through said axial passage and said connecting means and interconnecting said inlet and said tubular housing in fluid communication.

5. In combination: a tubing set in a well; a standing valve assembly at the lower end of said tubing and providing a pump seat; an annular sealing member in said tubing above said standing valve assembly; and an apparatus according to claim 4 movable through said tubing between the surface of the ground and said pump seat, the lower end of said pump being seatable on said pump seat with said inlet in communication with said standing valve assembly, and said annular sealing means being engageable with said annular sealing member.

6. In a pressure measuring apparatus for use with a well pump having upper and lower ends and having an inlet for well fluid at its lower end and having an annular sealing means above its lower end, the combination of: pressure measuring means connected to the upper end of the pump above said annular sealing means, and passage forming means extending axially through said pump and interconnecting said inlet and said pressure measuring means and placing said pressure measuring means in communication with said inlet.

7. In a pressure measuring apparatus for use with a fluid operated pump having upper and lower ends and having an inlet for well fluid at its lower end and having an annular sealing means above its lower end, said pump including a reciprocatory engine and pump piston assembly having an axial passage therethrough and including adjacent its lower end a balance tube receiving a portion of said engine and pump piston assembly, the combination of: a tubular housing having upper and lower ends; means connecting the lower end of said tubular housing to the upper end of said pump above said annular sealing means; passage forming means extending through said axial passage and said connecting means and interconnecting said tubular housing and said inlet in fluid communication, said passage forming means including a tube which extends through the lower end of said balance tube at its lower end into communication with said inlet and which is connected in fluid communication with said tubular housing at its upper end; and a pressure measuring device within said tubular housing.

8. In a pressure measuring apparatus for use with a fluid operated pump having upper and lower ends and having an inlet for well fluid at its lower end and having an annular sealing means above its lower end, said pump including a reciprocatory engine and pump piston assembly having an axial passage therethrough and including adjacent its lower end a balance tube receiving a portion of said engine and pump piston assembly, the combination of: a tubular housing having upper and lower ends; means connecting the lower end of said tubular housing to the upper end of said pump above said annular sealing means; passage forming means extending through said axial passage and said connecting means and interconnecting said tubular housing and said inlet in fluid communication, said passage forming means including a tube which extends through the lower end of said balance tube into communication with said inlet and which is connected in fluid communication with said tubular housing; a pressure measuring device within said tubular housing; and means for resiliently mounting said pressure measuring device in said tubular housing.

9. In a pumping and pressure measuring system for a well, the combination of: a bottom-hole housing set in the well and provided adjacent its lower end with a pump seat in fluid communication with the well, said bottom-hole housing being provided with an annular sealing member above said pump seat; a fluid operated pump movable vertically in said bottom-hole housing and having a lower end seated on said pump seat, said pump having at its lower end an inlet for well fluid to be pumped which communicates with the well through said pump seat, and said pump having an upper end; pressure measuring means connected to said upper end of said pump; passage forming means extending axially through said pump and interconnecting said inlet and said pressure measuring means and placing said pressure measuring means in communication with said inlet; and an annular sealing means carried by said pump adjacent said upper end thereof and engaging said annular sealing member, said annular sealing means being engageable with said annular sealing member when said pump is disposed within said bottom-hole housing and seated at said lower end thereof on said pump seat even when said pressure measuring means is disconnected from said upper end of said pump.

References Cited in the file of this patent
UNITED STATES PATENTS

| | | |
|---|---|---|
| 2,081,223 | Coberly | May 25, 1937 |
| 2,674,126 | Coberly | Apr. 6, 1954 |
| 2,792,709 | Bell et al. | May 21, 1957 |